(12) United States Patent
Claudio, Sr.

(10) Patent No.: US 9,878,730 B2
(45) Date of Patent: Jan. 30, 2018

(54) DOLLY FOR TRACK WELDER-CUTTER

(76) Inventor: Angel L. Claudio, Sr., Chesterton, IN (US)

( * ) Notice: Subject to any disclaimer, the term of this patent is extended or adjusted under 35 U.S.C. 154(b) by 439 days.

(21) Appl. No.: 12/817,367

(22) Filed: Jun. 17, 2010

(65) Prior Publication Data
US 2010/0322750 A1 Dec. 23, 2010

Related U.S. Application Data

(60) Provisional application No. 61/218,161, filed on Jun. 18, 2009.

(51) Int. Cl.
*B62B 1/00* (2006.01)
*B62B 5/00* (2006.01)

(52) U.S. Cl.
CPC .......... *B62B 5/0083* (2013.01); *B62B 5/0086* (2013.01); *B62B 1/008* (2013.01)

(58) Field of Classification Search
USPC .................................. 414/458–461; 280/404
See application file for complete search history.

(56) References Cited

U.S. PATENT DOCUMENTS

| | | | | |
|---|---|---|---|---|
| 3,631,999 A | * | 1/1972 | Walerowski | 414/458 |
| 4,362,458 A | * | 12/1982 | Jantzi | 414/458 |
| 4,405,144 A | * | 9/1983 | Chambers | 280/404 |
| 4,452,555 A | * | 6/1984 | Calabro | 410/53 |
| 4,474,384 A | * | 10/1984 | Cronje | 280/47.24 |
| 4,611,816 A | * | 9/1986 | Traister et al. | 280/43.2 |
| 4,936,733 A | * | 6/1990 | Girerd | 414/458 |
| 5,018,930 A | | 5/1991 | Hardin et al. | |
| 5,249,823 A | | 10/1993 | McCoy et al. | |
| D349,994 S | | 8/1994 | Schurr | |
| 5,599,031 A | | 2/1997 | Hodges | |
| 6,109,625 A | | 8/2000 | Hewitt | |
| 6,371,496 B1 | | 4/2002 | Balolia | |
| 6,627,004 B1 | | 9/2003 | Lockhart | |
| 6,634,658 B2 | | 10/2003 | Larouche | |
| 6,715,979 B1 | | 4/2004 | Theising et al. | |
| D535,454 S | | 1/2007 | Wareham | |
| 7,213,820 B2 | | 5/2007 | Drummond | |
| 2005/0066502 A1 | * | 3/2005 | Fransted | 29/256 |

* cited by examiner

*Primary Examiner* — Jonathan Snelting
(74) *Attorney, Agent, or Firm* — Hartman Global IP Law; Gary M. Hartman; Domenica N. S. Hartman (57) ABSTRACT

A transporting apparatus for track-mounted machines, also capable of aiding lifting, includes a pair of wheel assemblies. Each wheel assembly consisting of (i) a pair of wheels rotatably attached adjacent ends of an axle; (ii) a pair of parallel spaced-apart axle braces each rotatably engaged to the axle at a distal end of the axle braces; and (iii) a receiver member having a predetermined height and width. This receiver member has at least one bottom member and two spaced-apart substantially parallel side walls fixed to a proximal end of the axle braces.

1 Claim, 8 Drawing Sheets

DOLLY FOR TRACK WELDER-CUTTER

CROSS REFERENCE TO RELATED APPLICATION

This patent application is related to and claims priority from U.S. Provisional Patent Application Ser. No. 61/218,161 filed Jun. 18, 2009.

FIELD OF THE INVENTION

The present invention relates, in general, to devices for transporting and operating heavy tools and, more particularly, this invention relates to an apparatus for facilitating the use of traveling welding and/or torch cutting tools.

BACKGROUND OF THE INVENTION

Prior to the conception and development of the present invention users of motorized welding-cutting tools, such as the Gullco KAT®, had to manually lift the welding apparatus onto a work table or other elevated areas. Bug-O® offers a similar apparatus. Typically, these motorized burner/welders operate on about an 8-foot long straight rigid track, and the combined apparatus is sometimes called a track burner. Carriages, dollies, and other lifting and transporting devices are well known in industry for moving and otherwise facilitating the use of heavy power tools, but not for such track cutting units.

Hardin et al. in U.S. Pat. No. 5,018,930, McCoy et al. in U.S. Pat. No. 5,249,823, Hodges in U.S. Pat. No. 5,599,031, and Hewitt in U.S. Pat. No. 6,109,625 all teach variations of a size adjustable wheeled cart for moving and supporting a load such as a machine. These all have four wheels fixedly connected to a frame. Others, such as Larouche in U.S. Pat. No. 6,634,658 and Wareham in U.S. Design Pat. No. D535,454 both teach wheeled moving systems with separated wheel units. However, these two merely offer flanges that support cargo for the purpose of manually moving the cargo. They would not engage and work with the track beam of a cutting/welding apparatus.

SUMMARY OF THE INVENTION

The present invention provides a transporting apparatus for track-mounted machines, also capable of aiding lifting, including a pair of wheel assemblies, each wheel assembly consisting of (i) a pair of wheels rotatably attached adjacent ends of an axle; (ii) a pair of parallel spaced-apart axle braces each rotatably engaged to the axle at a distal end of the axle braces; and (iii) a receiver member having a predetermined height and width, this receiver member having at least one bottom member and two spaced-apart parallel side walls fixed to a proximal end of the axle braces.

In an alternative embodiment, the apparatus further includes a track stop in the end of the receiver member, and optional side couplers. In yet another embodiment, a prop assembly is included for enabling the wheel assembly to stand upright on a surface.

OBJECTS OF THE INVENTION

It is, therefore, one of the primary objects of the present invention to provide an apparatus to reduce the risk of back strain for those using track-mounted burning/welding units.

Another object of the present invention is to provide an adaptor with wheels for facilitating the transport and setup of automated welding/burning machines.

Still another object of the present invention is to provide an accessory for track burners and welders that readily attaches without tools and makes the burner/welder more mobile.

Yet another object of the present invention is to provide an apparatus that serves to convert a track burner into an integral part of a cart assembly.

An additional object of the present invention is to provide a transporting dolly for track-mounted tools with accessories for enabling free standing.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 1:
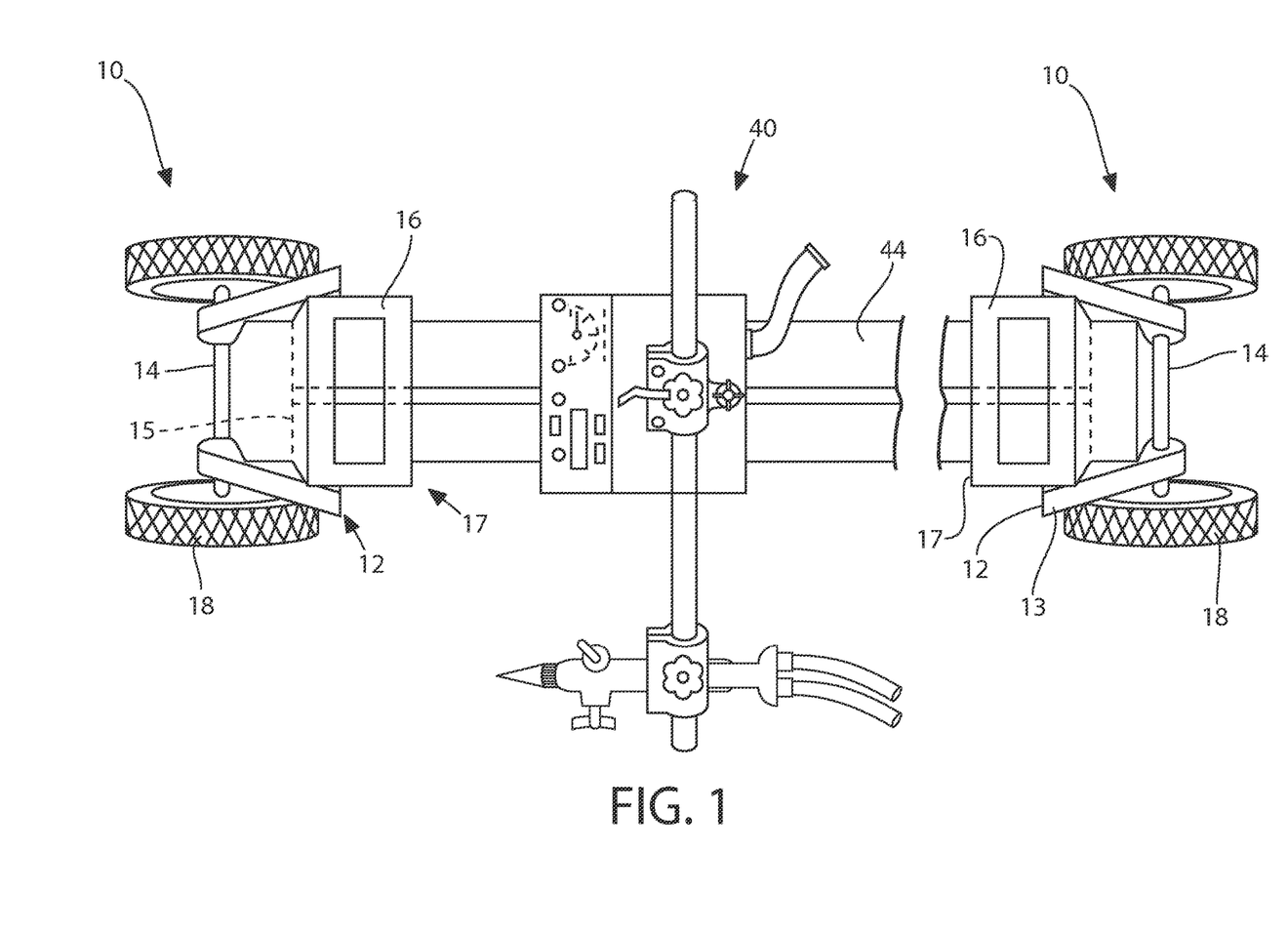
FIG. 1 is a top plan view of the present invention shown supporting an automated cutting torch.

Referring initially to FIG. 1, a presently preferred embodiment is shown in a top plan view supporting an automated cutting torch assembly, generally designated 40, that traverses a track 44. The apparatus includes a pair of wheel assemblies, generally 10. The main body member 12 of the apparatus consists of two axle braces 13, sidewalls 16, and multiple cross members 15 substantially forming a receiver member 17, a short channel called a receiver member is substantially open at the front end and mostly closed at the rear end to permit the ends of track 44 to slide in and be frictionally or otherwise retained. The track 44 is typically 244 cm (8-ft) long, but numerous other lengths can be accommodated.

Proximal the free ends of the axle braces 13 are axle apertures through which an axle 14 extends on both sides sufficiently for attachment of wheels 18 to the outer side of the axle braces 13. The generally rectangular or four-sided receiver member 17, having a height of about 2.5 to 7.6 cm (1 to 3 inches) and a width of 7.6 to 22.9 cm (3 to 9 inches), is fixedly secured at a predetermined angle to the plane of the two braces 13. The height and width of the receiver box 17 are slightly greater than that of the track 44. The four sides of the receiver member 17 are substantially rigid but need not be solid.

Figure 2:
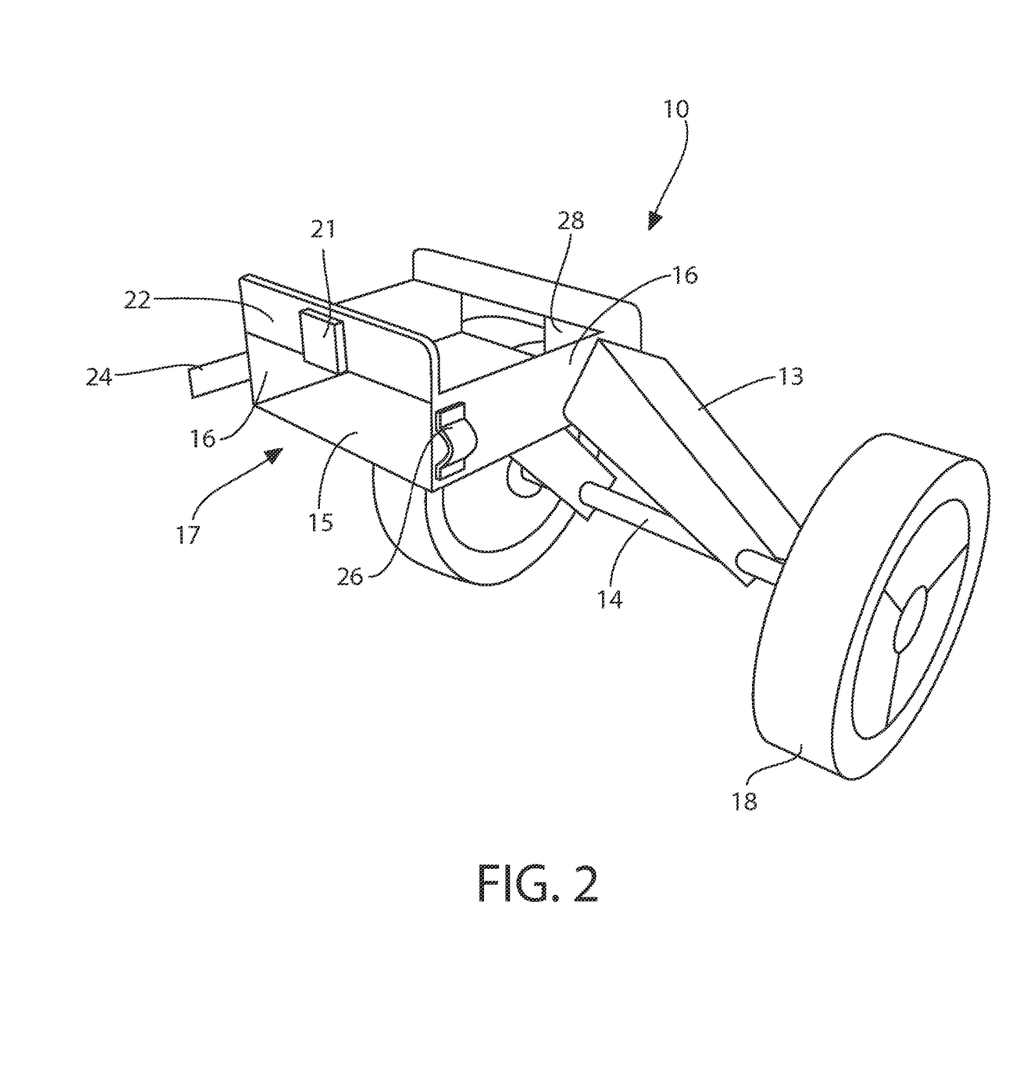
FIG. 2 is a frontal perspective view of a wheel assembly according to the present invention.

FIG. 2 is a frontal perspective view of one of the pair of wheel assemblies 10 making up the present invention. A channel portion, receiver member 17, is fixedly attached to two spaced-apart parallel axle braces 13 projecting downward at an angle to the receiver member 17. The receiver member 17, which is substantially open in the front and substantially closed in the rear, has a floor portion 15, two parallel sidewalls 16 between 3 and 9 inches apart, and at least one front cross member 22. An optional gear tab 21 may be mounted centrally on the front cross member 22. The floor portion 15 can be multiple tie strips connecting angle irons forming the sidewalls 16. At the distal ends of the axle brace 13, an axle 14 extends perpendicularly through the distal brace ends and attaches at the ends to wheels 18. The wheel-axle arrangement may be any of several common ones with wheels 18 rotating on the axles 14 or the wheels 18 and axles rotating together with sleeves and bearings at the axle braces 13. There may be optional protrusions or attachments from the sidewall 16 such as a bar forming a male coupler 24 and loop being a female coupler 26. Preferably, but optionally, there is a track stop 28 at the rear end of the receiver member 17 to prevent the track from extending any further through the receiver 17.

Figure 3:
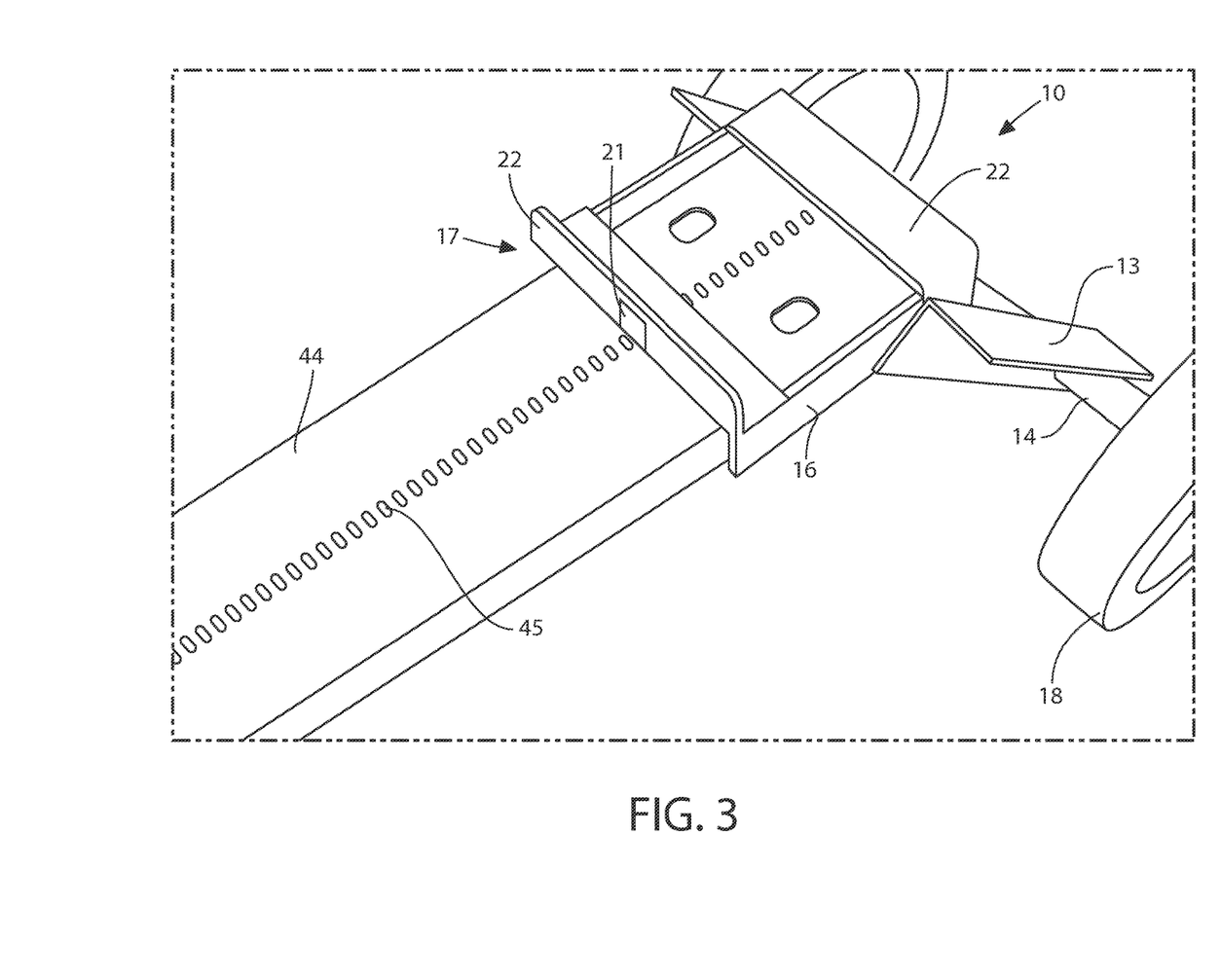
FIG. 3 is a partial top-side perspective view of one of the two wheel assemblies making up the present invention and illustrating the engagement with one end of a track.

FIG. 3 is a top-side perspective view of one of the two wheel assemblies 10 making up the present invention and illustrating the engagement with one end of the track 44. There are two axle braces 13 which connect at one end to an axle 14 rotatably joined at each end to a wheel 18. The wheel 18 is preferably the hard rubber type on a steel wheel such as one would commonly find on a lawnmower. The receiver member 17 slips over the track 44, and in this case, there are two top cross members 22, typically short pieces of angle iron. Teeth 45 on the track 44 can engage with the gear tab 21 to inhibit unwanted movement of the track 44.

Figure 4:
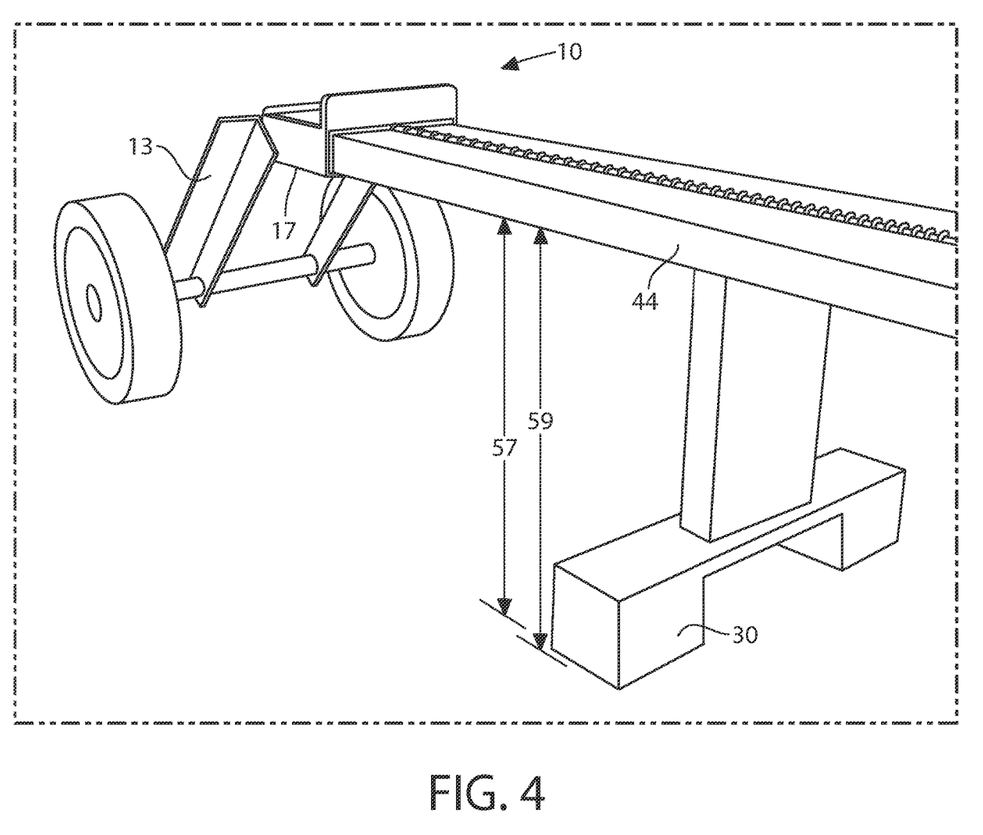
FIG. 4 is a side perspective view of an alternative embodiment of the present invention.

FIG. 4 is yet another perspective view of the present invention, generally shown as 10, and in this instance showing the track foot 30. The inverted T-shaped foot 30 attaches to the underside of the track 44 to add stability during operation when the burner assembly (not shown) is mounted on the track 44. The track 44 is shown engaged in the receiver member 17 of the wheel assembly 10. The ground clearance 59 under the receiver box 17 must be greater than the height 57 of the track foot 30 to prevent touching on the ground or floor during transporting of the track 44 with its installed tool.

Figure 5:
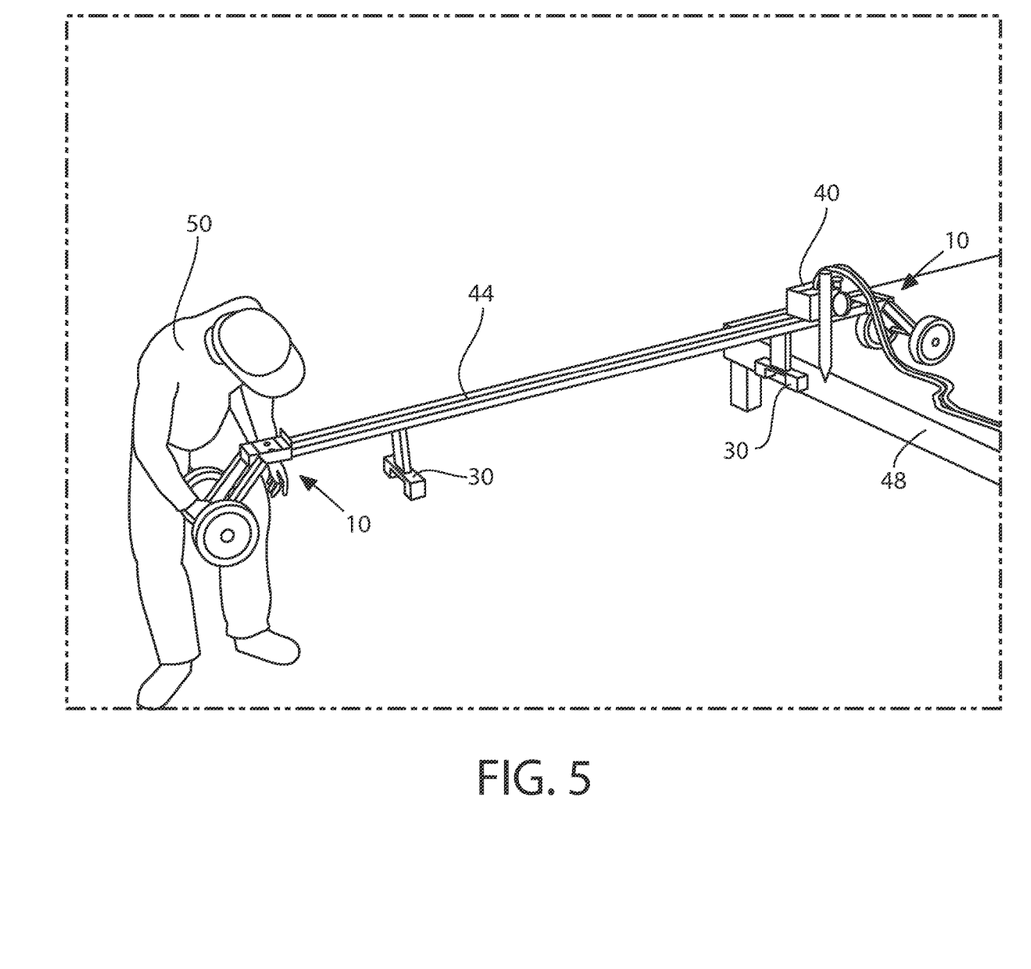
FIG. 5 provides a side perspective view of the present invention as it would commonly be used.

FIG. 5 provides a side perspective view of the present invention as it would commonly be used. Two wheel assemblies 10 are at each end of the track 44 on which the burner/welder apparatus 40 is engaged and ready for service. One wheel assembly 10 has been raised onto a work table or elevated slab 48 while the welder/burner 40 was at the other end. The welder/burner 40 was then slid to the other end of the track which was elevated. A person 50 then lifts the other end at the second wheel assembly 10 and rolls the entire apparatus forward until all is on the elevated surface or slab 48. The track burner can then be put into position for use.

Figure 6:
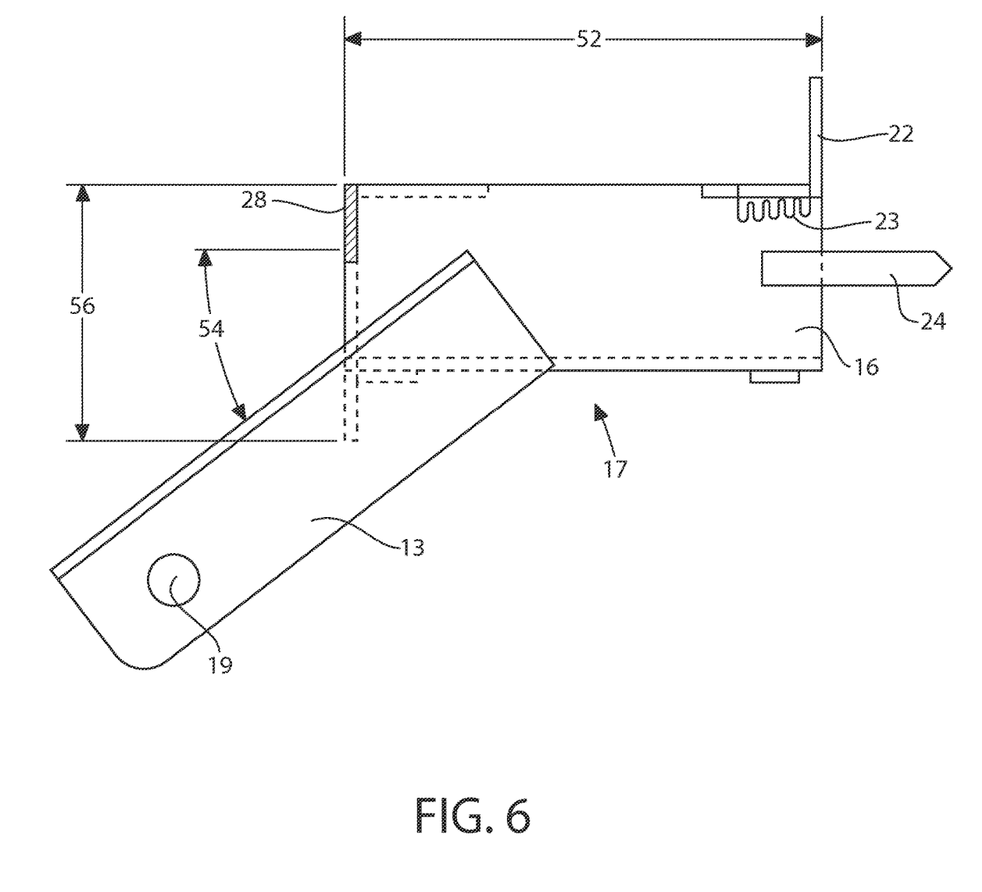
FIG. 6 is a side elevation view of one side of a portion of the wheel assembly of the present invention.

FIG. 6 is a side elevation view of one side of a portion of the wheel assembly of the present invention. The predetermined angle 54 between the longitudinal axis of angle brace 13 and the plane of the receiver member 17 is preferably between about 30 and 45 degrees, but can be as much as 90 degrees. The height 56 of the inside of the receiver member 17 is preferably between 2.54 and 7.62 cm (1 and 3 inches), and the length 52 is between about 7.6 and 12.7 cm (3 and 8 inches). The teeth 23 are on the inside of the front of the receiver member 17 and the track stop 28 is on the rear end. The toothed piece 23 may be of the Sur-lock® type. The male coupler 24 is shown extending from the outer surface of a wall 16.

Figure 7:
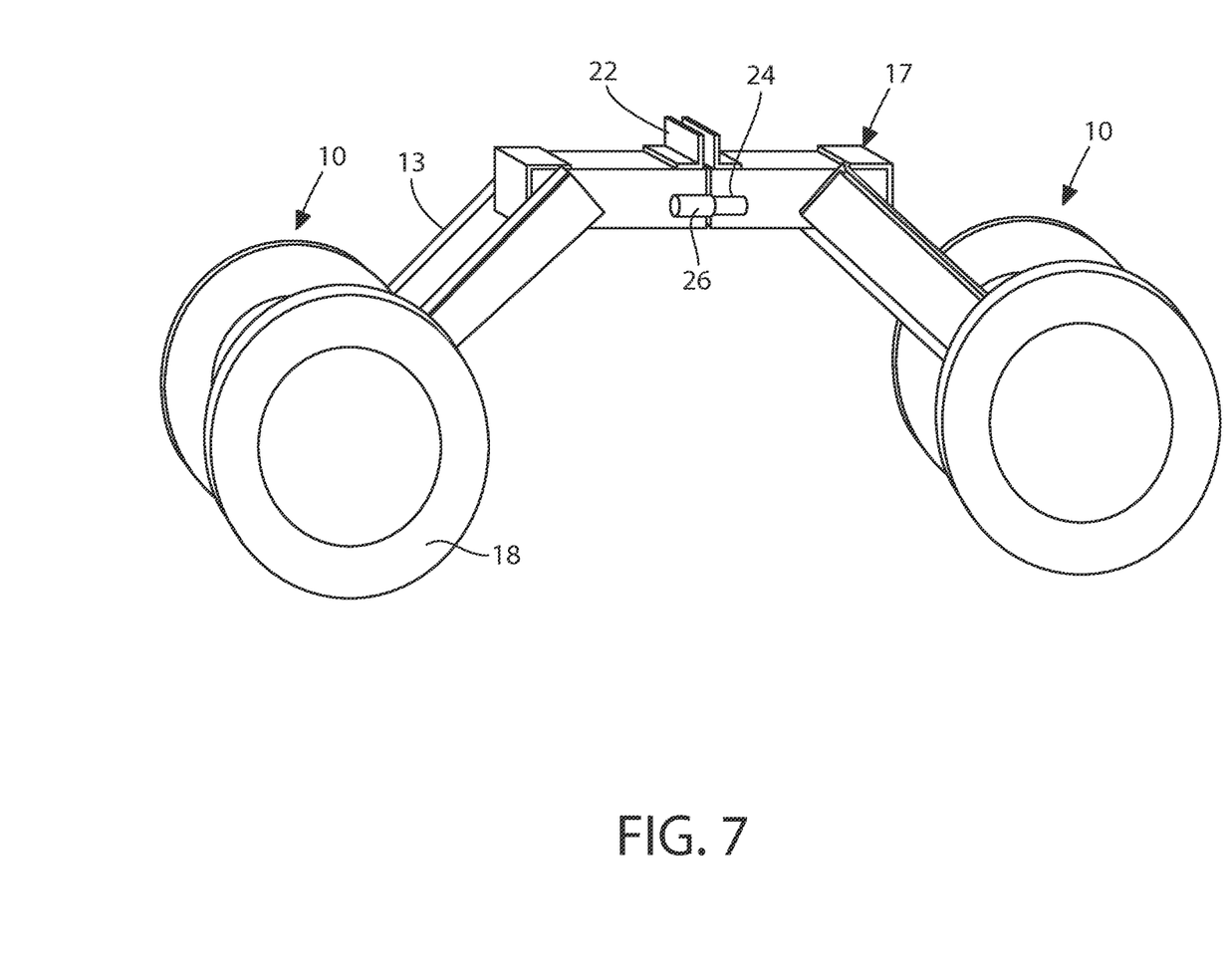
FIG. 7 is a perspective view of the two wheel assemblies coupled for ready transport.

FIG. 7 provides a perspective view of the two wheel assemblies 10 coupled together for ready transport. The male couplers 24 are engaged with the female couplers 26 on the outside of the receiver member 17. The two vertical flanges of the cross members 22 are abutting as well. With this joining of the two wheel assemblies 10, the pair can be readily rolled or carried to a new location.

Figure 8:
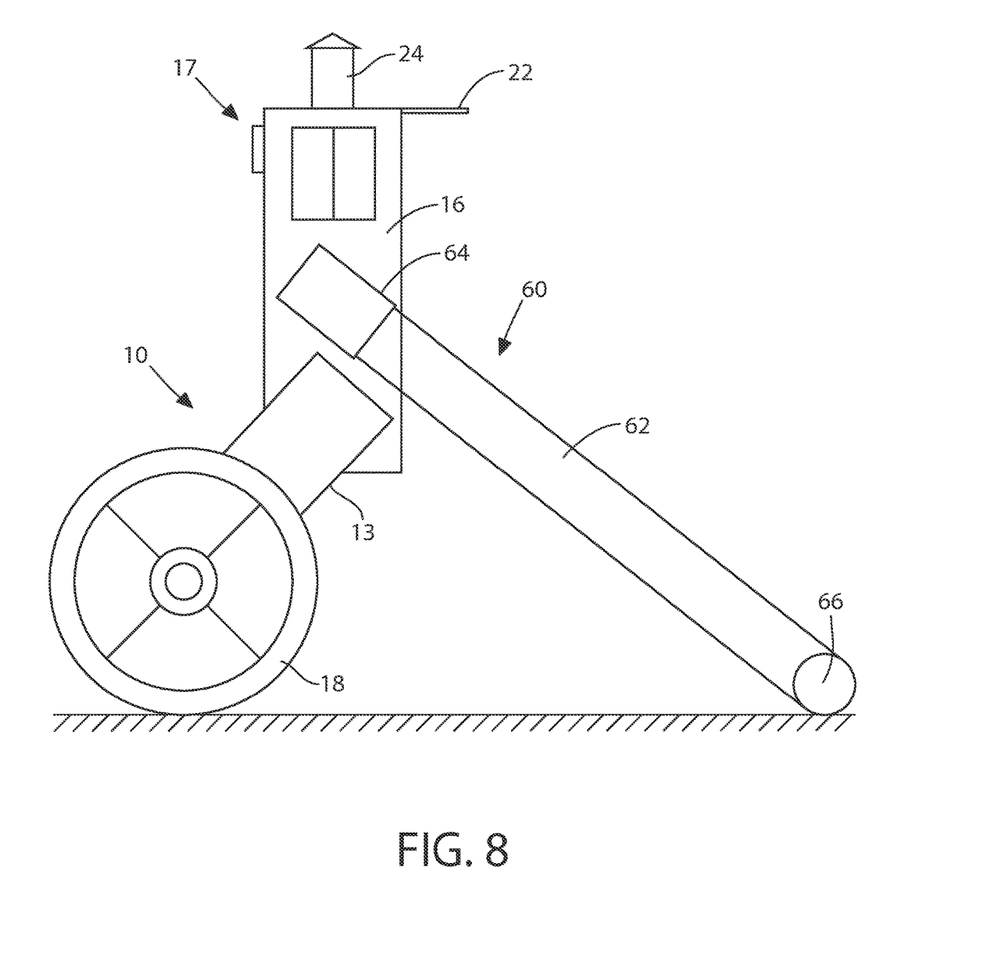
FIG. 8 is a perspective view of a wheel assembly with an optional prop assembly.

FIG. 8 is a perspective view of a wheel assembly 10 with an optional prop assembly 60, which enables a wheel assembly 10 to rest on a surface with the open end of receiver member 17 having male coupler 24 extending vertically. The prop assembly 60 preferably consists of two elongated arms 62, each extending from and removably engaged within a sleeve 64 fixed to the outer surface of the sidewalls 16. These two arms attach adjacent the distal ends perpendicularly to a tee connector rod 66, with the intent that the tee connector rod 66 will rest horizontally on the same surface as the wheels. The prop assembly can be removed and stored when not needed.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. An apparatus for transporting and aiding lifting of cutting and welding machines operating along an elongated straight track having leg braces, the apparatus comprising:
   a) a receiver member including:
      (i) a bottom member,
      (ii) a pair of side walls upstanding on the bottom member and elongated in a generally horizontal direction when the apparatus is in use,
      (iii) a cross member having each end thereof connected to one end of a respective side wall, the cross member forming in combination with the pair of the side walls and the bottom member an open end of the receiver member, the open end is shaped and sized so as to receive an end of the elongated straight track therewithin, wherein a top edge of the cross member is disposed above top edges of the pair of side walls when the apparatus is in the use, and
      (iv) a member positioned at an end of the receiver member being opposite to the open end, the member forming in combination with the pair of the side walls and the bottom member at least partially closed end of the receiver member;
   b) a wheel set including an axle and a pair of wheels;

c) a pair of braces, each of the pair of braces having one end thereof attached to a respective side wall and having an opposite end thereof connected to the axle; and d) a prop assembly comprising a pair of sleeves, each of the pair of sleeves fixed to an outer surface of one side wall, a pair of elongated arms, each of the pair of elongated arms having one end thereof received within a respective sleeve and a rod attached to opposite ends of the pair of elongated arms, wherein the prop assembly is configured to position the at least one receiver member generally vertically when the pair of wheels are rested on a surface and wherein the open end extends away from the surface.

\* \* \* \* \*